(12) United States Patent
Leonard et al.

(10) Patent No.: US 9,790,919 B2
(45) Date of Patent: Oct. 17, 2017

(54) JOINT ASSEMBLY FOR ROTOR BLADE SEGMENTS OF A WIND TURBINE

(71) Applicant: General Electric Company, Schenectady, NY (US)

(72) Inventors: Jay F. Leonard, Greenville, SC (US); Paul William Judge, Inman, SC (US)

(73) Assignee: General Electric Company, Schenectady, NY (US)

( * ) Notice: Subject to any disclaimer, the term of this patent is extended or adjusted under 35 U.S.C. 154(b) by 709 days.

(21) Appl. No.: 14/188,756

(22) Filed: Feb. 25, 2014

(65) Prior Publication Data

US 2015/0240780 A1    Aug. 27, 2015

(51) Int. Cl.
*F03D 1/06* (2006.01)

(52) U.S. Cl.
CPC ...... *F03D 1/0675* (2013.01); *F05B 2240/302* (2013.01); *F05B 2260/301* (2013.01); *Y02E 10/721* (2013.01)

(58) Field of Classification Search
CPC .. F03D 1/0675; F03D 1/001; F05B 2240/302; F05B 2260/301; F05B 2260/30; Y02E 10/721
See application file for complete search history.

(56) References Cited

U.S. PATENT DOCUMENTS

| | | | |
|---|---|---|---|
| 2,456,007 A | 3/1949 | Bragdon et al. | |
| 2,981,337 A | 4/1961 | Stuart, III | |
| 3,013,614 A | 12/1961 | Platt | |
| 4,079,903 A | 3/1978 | Ashton et al. | |
| 4,895,491 A | 1/1990 | Cross et al. | |
| 5,127,802 A | 7/1992 | Carlson et al. | |
| 7,186,086 B2 * | 3/2007 | Yoshida | F03D 1/001 416/146 R |
| 7,334,989 B2 | 2/2008 | Arelt | |
| 7,381,029 B2 | 6/2008 | Moroz | |

(Continued)

FOREIGN PATENT DOCUMENTS

| | | | | |
|---|---|---|---|---|
| CA | 2393389 A1 * | 6/2001 | | F01D 5/066 |
| EP | 1808598 | 7/2007 | | |

(Continued)

OTHER PUBLICATIONS www.wind-energy-the-facts.org/enpart-i-technology/chapter-3-wind-turbine-technology/current-developments

*Primary Examiner* — Jason L Vaughan
*Assistant Examiner* — Amanda Meneghini
(74) *Attorney, Agent, or Firm* — Dority & Manning, P.A.

(57) ABSTRACT

The present disclosure is directed to a rotor blade assembly and/or a joint assembly for a wind turbine blade. In one embodiment, the rotor blade assembly includes at least first and second blade segments connected together at a chord-wise extending joint, one or more shear-loaded pins configured through the chord-wise extending joint, and an anti-rotation locking feature. As such, the rotor blade assembly includes a maintenance-free bolted joint. The first blade segment has a body shell defining a generally aerodynamic profile. The body shell includes a suction side surface and a pressure side surface. The shear-loaded pin may extend in a generally flap-wise direction (i.e. from the suction side surface to the pressure side surface of the body shell) or in a generally chord-wise direction (i.e. from the pressure side to the suction side of the body shell).

15 Claims, 9 Drawing Sheets

(56) References Cited

U.S. PATENT DOCUMENTS

| | | | |
|---|---|---|---|
| 7,393,184 B2 | 7/2008 | Cairo | |
| 7,427,189 B2 | 9/2008 | Eyb | |
| 7,470,114 B2 | 12/2008 | Bonnet | |
| 7,654,799 B2 * | 2/2010 | Eyb | F03D 1/0675 29/889.71 |
| 7,891,947 B2 * | 2/2011 | Chen | F03D 1/0675 416/225 |
| 7,901,188 B2 * | 3/2011 | Llorente Gonzalez | F03D 1/0675 416/223 R |
| 7,922,454 B1 * | 4/2011 | Riddell | F03D 1/001 416/224 |
| 7,997,874 B2 | 8/2011 | van der Bos | |
| 8,075,275 B2 | 12/2011 | Althoff et al. | |
| 8,142,157 B2 * | 3/2012 | Kita | F03D 1/0675 416/146 R |
| 8,221,085 B2 | 7/2012 | Livingston et al. | |
| 8,317,483 B2 | 11/2012 | Gerber et al. | |
| 8,376,713 B2 | 2/2013 | Kawasetsu et al. | |
| 8,510,947 B2 * | 8/2013 | Kirkpatrick | B23P 15/04 29/411 |
| 8,517,689 B2 | 8/2013 | Kyriakides et al. | |
| 8,777,573 B2 * | 7/2014 | Hibbard | F03D 1/001 416/132 B |
| 9,371,817 B2 * | 6/2016 | Olthoff | F03D 1/065 |
| 9,388,789 B2 * | 7/2016 | Hibbard | F03D 1/0675 |
| 2003/0138290 A1 * | 7/2003 | Wobben | B64C 27/46 403/293 |
| 2007/0253824 A1 * | 11/2007 | Eyb | F03D 1/0675 416/223 R |
| 2008/0069699 A1 | 3/2008 | Bech et al. | |
| 2008/0145231 A1 * | 6/2008 | Llorente Gonzales | F03D 1/0675 416/243 |
| 2008/0175682 A1 * | 7/2008 | Musil | B23B 29/0341 408/153 |
| 2008/0181781 A1 | 7/2008 | Livingston et al. | |
| 2008/0310964 A1 | 12/2008 | Llorente Gonzalez et al. | |
| 2009/0155084 A1 * | 6/2009 | Livingston | B29C 65/54 416/223 R |
| 2009/0162206 A1 | 6/2009 | Zirin et al. | |
| 2009/0169323 A1 | 7/2009 | Livingston | |
| 2009/0196755 A1 | 8/2009 | Peace et al. | |
| 2009/0208341 A1 | 8/2009 | Llorente Gonzalez et al. | |
| 2010/0132884 A1 | 6/2010 | Baehmann et al. | |
| 2010/0143143 A1 | 6/2010 | Judge | |
| 2011/0052403 A1 * | 3/2011 | Kawasetsu | F03D 1/0675 416/226 |
| 2011/0081247 A1 * | 4/2011 | Hibbard | F03D 1/0675 416/226 |
| 2011/0081248 A1 * | 4/2011 | Hibbard | F03D 1/0675 416/226 |
| 2011/0091236 A1 * | 4/2011 | Oi | G03G 15/1675 399/90 |
| 2011/0110789 A1 | 5/2011 | Luebbe | |
| 2011/0142667 A1 | 6/2011 | Miebach et al. | |
| 2011/0142675 A1 | 6/2011 | van der Bos | |
| 2011/0243736 A1 | 10/2011 | Bell | |
| 2011/0293432 A1 | 12/2011 | Hibbard et al. | |
| 2012/0141287 A1 | 6/2012 | Hynum et al. | |
| 2012/0269643 A1 | 10/2012 | Hibbard et al. | |

FOREIGN PATENT DOCUMENTS

| | | | |
|---|---|---|---|
| EP | 1 761 702 B1 | 11/2011 | |
| EP | 2 288 807 | 9/2013 | |
| FR | EP 0321344 A1 * | 6/1989 | F01D 5/066 |
| JP | EP 1950414 A2 * | 7/2008 | F03D 1/0675 |
| WO | WO 01/46582 | 6/2001 | |
| WO | WO 2005/064156 | 7/2005 | |
| WO | WO 2006/064077 | 6/2006 | |
| WO | WO 2011/070137 | 6/2011 | |

* cited by examiner

JOINT ASSEMBLY FOR ROTOR BLADE SEGMENTS OF A WIND TURBINE

FIELD OF THE INVENTION

The present subject matter relates generally to rotor blades for a wind turbine, and more particularly to a joint assembly for joining multiple blade segments of a rotor blade of a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to improve the overall performance of wind turbines by modifying the size, shape and configuration of wind turbine rotor blades. One such modification has been to alter the configuration of the tip of the rotor blade. In particular, blade tips may be specifically designed to enhance or improve various aspects of a rotor blade's performance. For example, certain blade tips may be designed to operate efficiently in specific wind classes. Additionally, blade tips may be configured to enhance specific operating conditions of the wind turbine, such as by being configured to lower torque, reduce noise, or capture the maximum possible energy.

Thus, given that different operating advantages may be provided to a wind turbine depending on the configuration of the blade tip, it would be advantageous to have a joint design for multiple blade segments that allowed for the quick and efficient assembly and disassembly of blade tips on and from a rotor blade. However, known joint designs are typically complex, expensive to produce, and are manually intensive to install and maintain. For example, joint designs that utilize an adhesive provide permanent joints that cannot be modified with changing wind conditions. In addition, joint designs that utilize bolts typically require periodic maintenance to ensure that the bolts maintain a required torque.

Accordingly, there is a need for an improved joint assembly for joining multiple blade segments of a rotor blade that addresses the aforementioned issues.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a rotor blade assembly for a wind turbine. The rotor blade assembly includes at least first and second blade segments connected together at a chord-wise extending joint, one or more shear-loaded pins, and an anti-rotation locking feature. The first blade segment has a body shell defining a generally aerodynamic profile. The body shell includes a suction side surface and a pressure side surface. The one or more shear-loaded pins are configured through the chord-wise extending joint and extend in a generally flap-wise direction. The anti-rotation locking feature is configured with the at least one shear-loaded pin so as to secure the one or more shear-loaded pins within the body shell.

In another aspect, the present subject matter is directed to a rotor blade assembly for a wind turbine. The rotor blade assembly includes at least first and second blade segments, one or more shear-loaded pins, and an anti-rotation locking feature. The first blade segment includes a recess member defining a cavity therein. The second blade segment includes a post member extending outwardly from a chord-wise extending face of the second blade segment. The post member is configured within the cavity of the recess member so as to define a chord-wise extending joint between the first blade segment and the second blade segment. The one or more shear-loaded pins are configured through the chord-wise extending joint in a generally flap-wise direction. The anti-rotation locking feature is configured with the at least one shear-loaded pin so as to secure the shear-loaded pin within the body shell.

In yet another aspect, a rotor blade joint assembly for connecting multiple blade segments of rotor blade of a wind turbine is disclosed. The joint assembly includes a recess member, a post member, one or more shear-loaded pins, and anti-rotation locking feature. The recess member is configured for receipt within a first blade segment and defines a cavity configured therein. The post member is configured for receipt within a second blade segment. Further, the post member includes a first portion configured to extend outwardly from a chord-wise extending face of the second blade segment and a second portion configured for receipt within the second blade segment. The one or more shear-loaded pins are configured to extend through the first portion of the post member and the recess member when the first portion of the post member is received within the recess member. In addition, the one or more shear-loaded pins are configured to extend in a generally flap-wise direction when the first portion of the post member is received within the recess member. Moreover, the anti-rotation locking feature is configured with the at least one shear-loaded pin so as to secure the one or more shear-loaded pins within the body shell.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
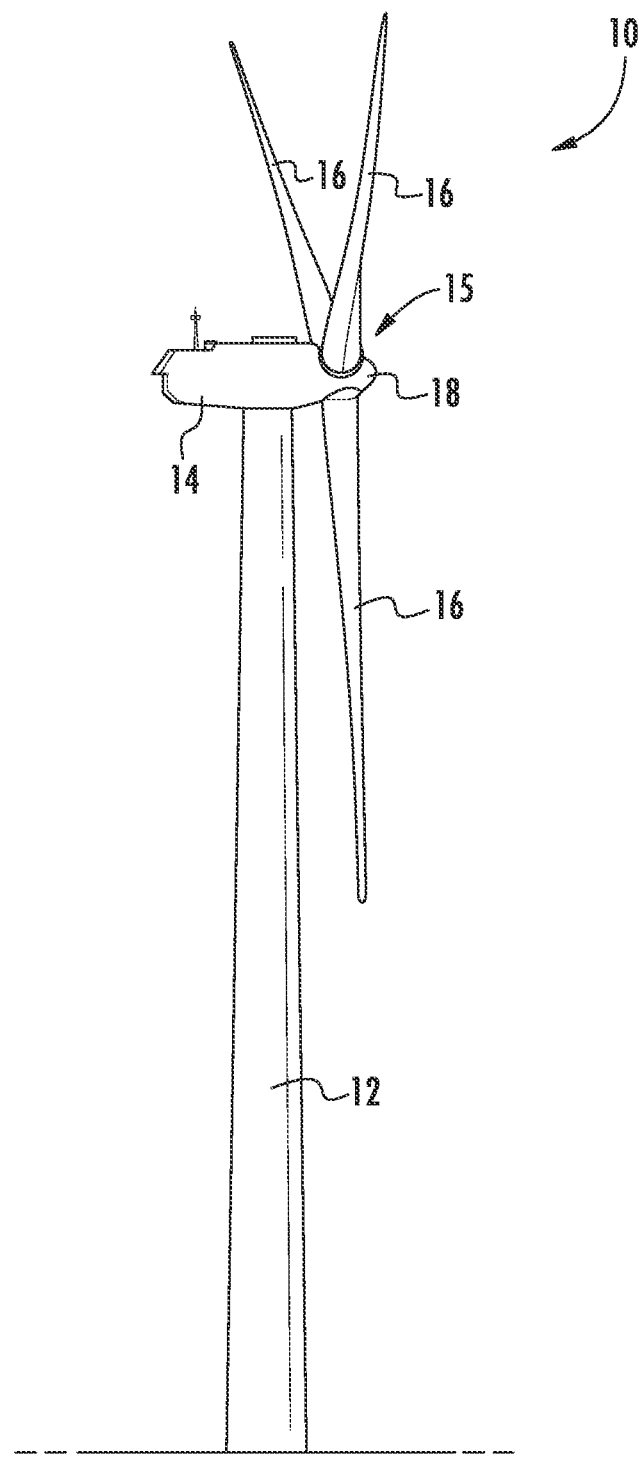
FIG. 1 illustrates a perspective view of a wind turbine of conventional construction.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a maintenance-free bolted joint assembly for a rotor blade a wind turbine. In one embodiment, for example, the rotor blade includes at least first and second blade segments connected together at a chord-wise extending joint. At least one shear-loaded pin is configured through the chord-wise extending joint and extends in a generally flap-wise direction. In addition, one or more shear-loaded pins are secured within the rotor blade via an internal anti-rotation locking feature configured with the one or more shear-loading pins.

The joint assembly of the present disclosure provides many advantages not present in the prior art. For example, the bolted joint assembly and locking feature provides a robust joint that prevents loosening and eliminates re-torque maintenance. Further, the bolted joint assembly enables future service offerings for improved wind turbine performance and/or value, e.g. by providing customizable blade tips and/or blade improvements as they become available. In addition, the segmented rotor blade reduces shipping costs. Still further embodiments provide a molded and/or machined customizable blade tip having easily controller tolerances over critical leading and trailing edge geometry, thereby reducing noise.

Referring now to the drawings, FIG. 1 illustrates perspective view of a wind turbine 10 of conventional construction. The wind turbine 10 includes a tower 12 with a nacelle 14 mounted thereon and a rotor 15. The rotor 15 includes a rotatable hub 18 having a plurality of rotor blades 16 mounted thereon, which is, in turn, connected to a main flange that turns a main rotor shaft (not shown). The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
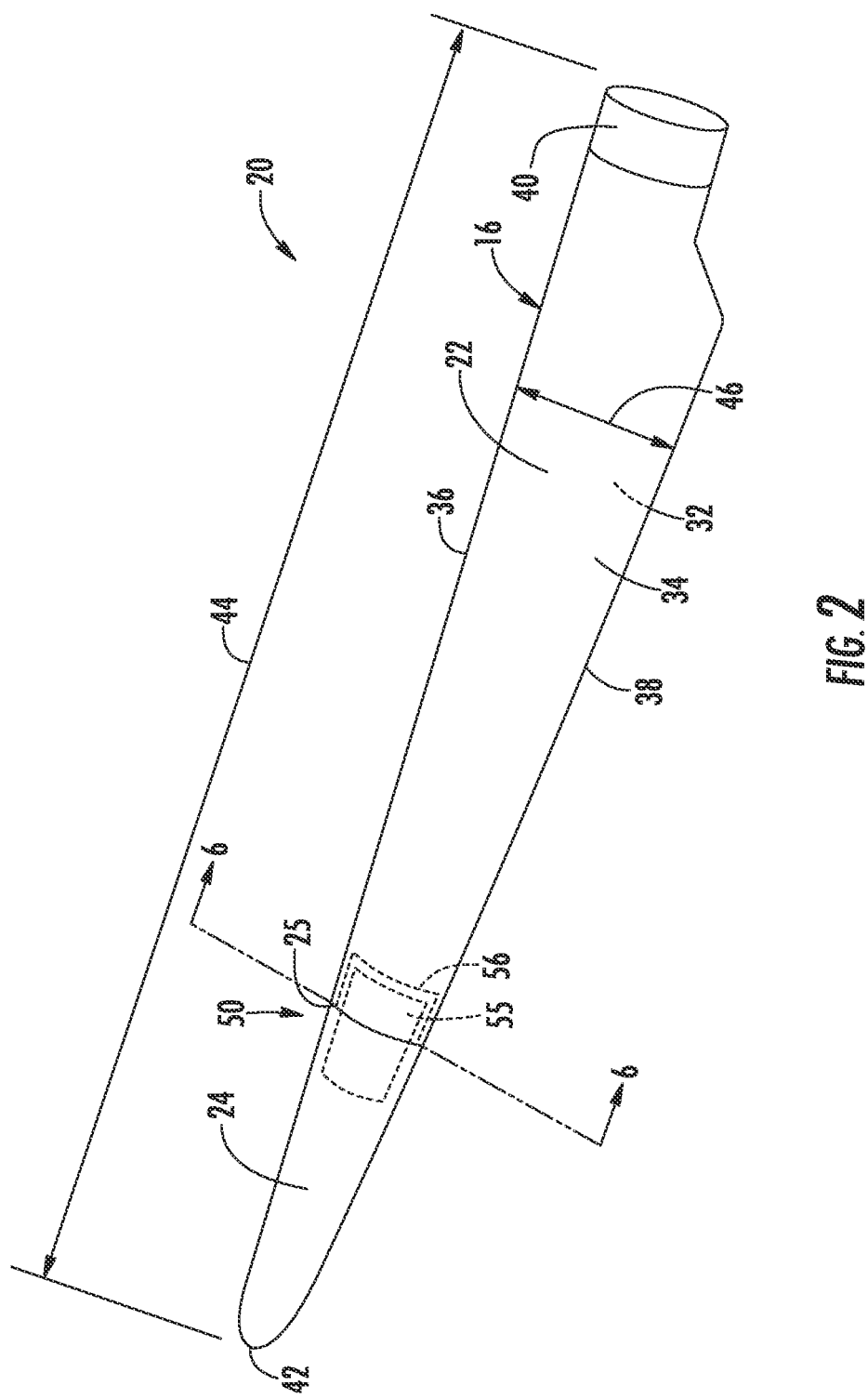
FIG. 2 illustrates a perspective view of one embodiment of a rotor blade having a joint assembly in accordance with aspects of the present subject matter.

Referring now to FIG. 2, a perspective view of the rotor blade 16 in accordance with aspects of the present subject matter is illustrated. As shown, the rotor blade 16 may generally include a suction side 34 and a pressure side 32 (FIG. 3) extending between a leading edge 36 and a trailing edge 38. Additionally, the rotor blade 16 may include a root end 40 configured to be mounted to the hub 18 (FIG. 1) of a wind turbine 10 and tip end 42 disposed opposite the root end 40. Further, the rotor blade 16 may have a span 44 defining the total length between the root end 40 and the tip end 42 and a chord 46 defining the total length between the leading edge 36 and the trailing edge 38. As is generally understood, the chord 46 may generally vary in length with respect to the span 44 as the rotor blade extends from the blade root 40 to the blade tip 42.

Additionally, the rotor blade 16 includes a plurality of blade segments 22, 24. For example, in the illustrated embodiment, the rotor blade 16 includes a first blade segment 22 connected to a second blade segment 24 at a chord-wise extending joint 25. More specifically, the first blade segment 22 may include an attachment member 55 configured to attach to a corresponding attachment member 56 of the second blade segment 24 in order to form the joint 25 between the blade segments 22, 24. As such, when the blade segments 22, 24 are assembled, the rotor blade segments 22, 24 and the attachment members 55, 56 may generally define a complete rotor blade assembly 20 having a substantially continuous aerodynamic profile. It should be appreciated that, although the rotor blade assembly 20 of the present subject matter is illustrated and described herein as including two blade segments 22, 24, the rotor blade assembly 20 may generally comprise any number of blade segments configured as described and illustrated herein. In addition, the attachment members 55, 56 may be integral with their respective rotor blade segments 22, 24 or may be separate add-on features.

Figure 3:
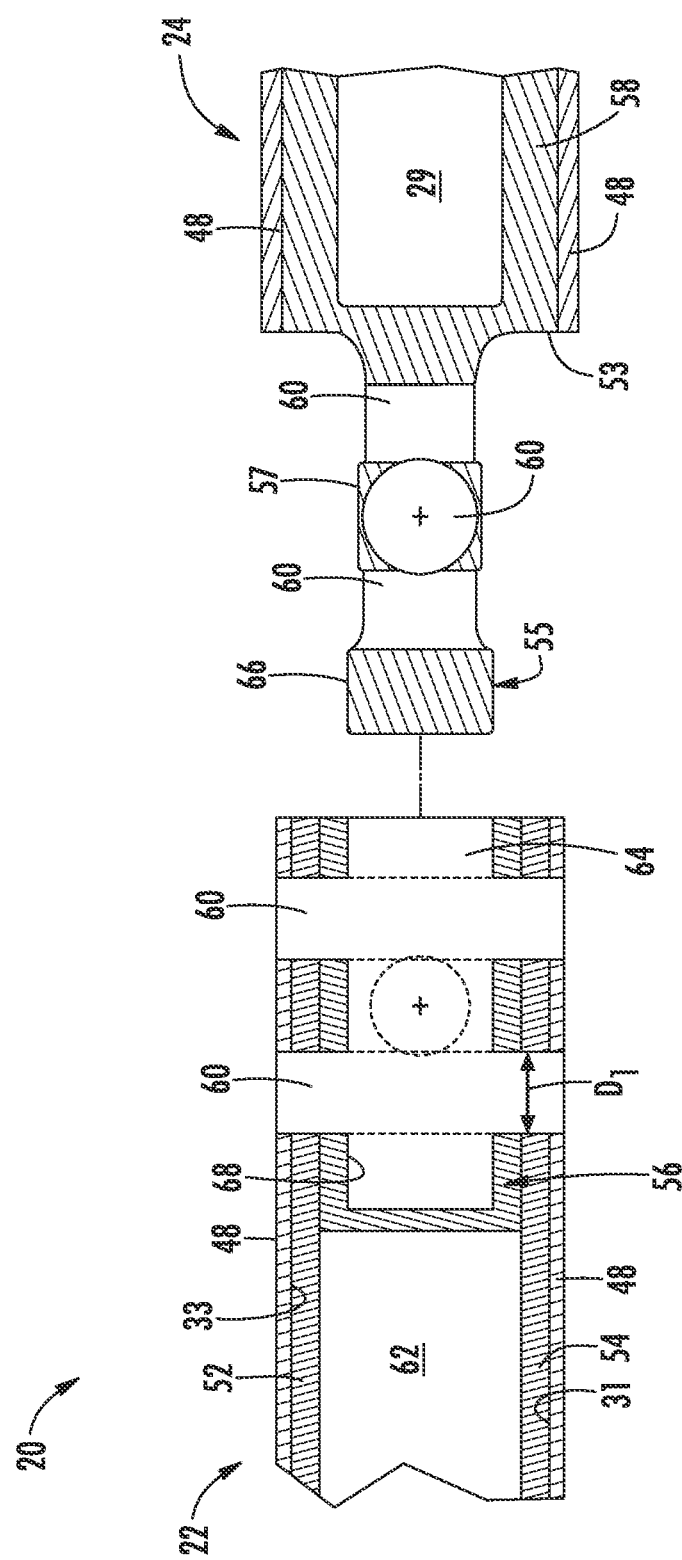
FIG. 3 illustrates a partial, perspective view of one embodiment of a rotor blade assembly viewed from the leading edge of the rotor blade in an assembled state in accordance with aspects of the present subject matter.
Figure 4:
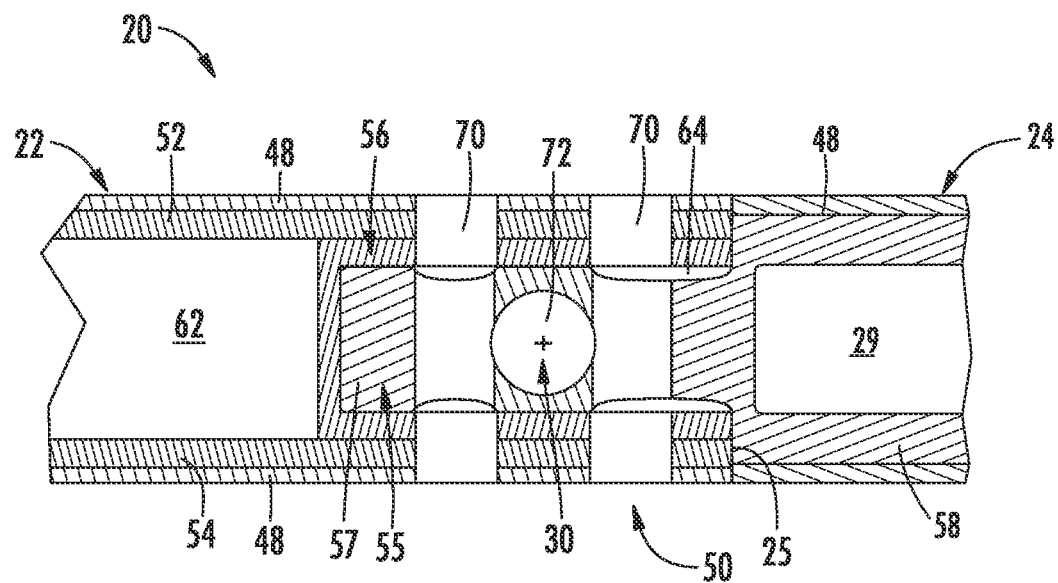
FIG. 4 illustrates a partial, cross-sectional view of the embodiment of FIG. 3 in an assembled state in accordance with aspects of the present subject matter.
Figure 5:
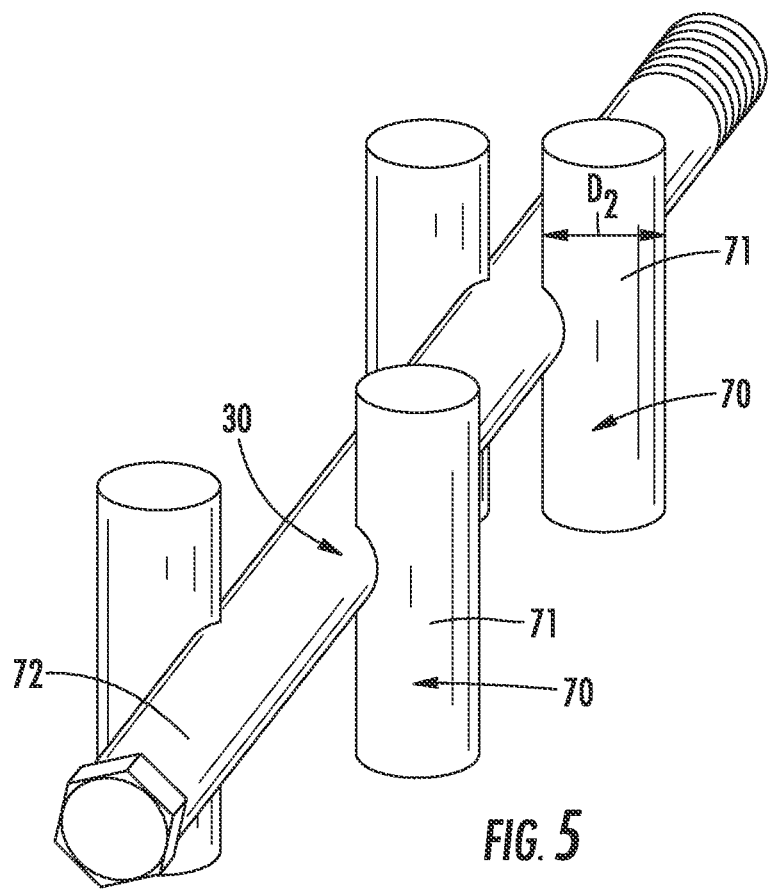
FIG. 5 illustrates a partial, perspective view of one embodiment of a locking feature of a joint assembly in accordance with aspects of the present subject matter.
Figure 6:
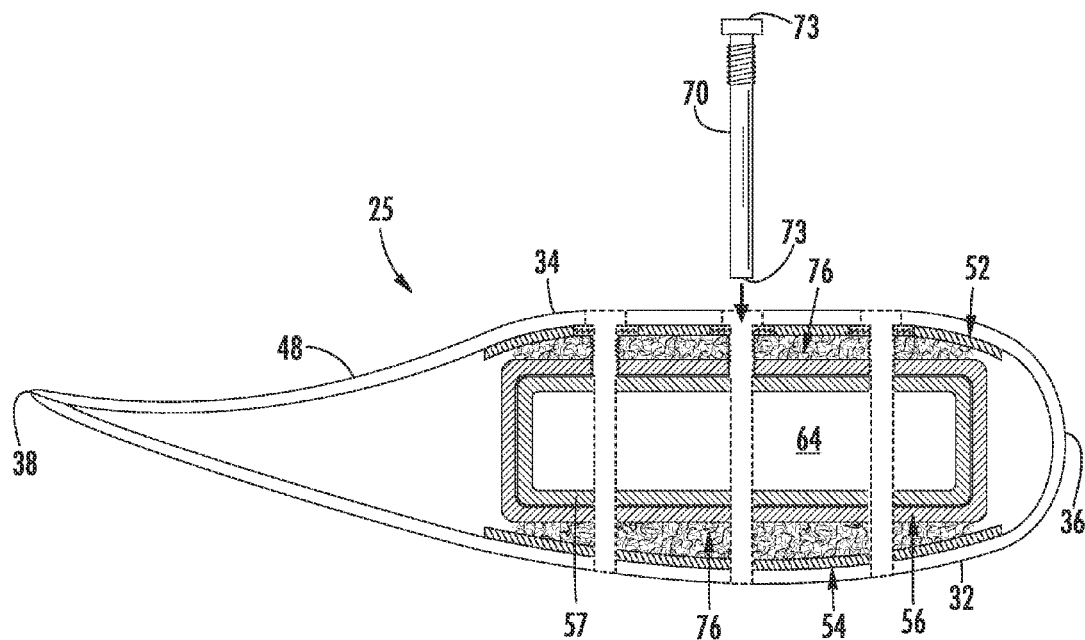
FIG. 6 illustrates a cross-sectional view of the joint assembly of FIG. 2 along line 6-6.
Figure 7:
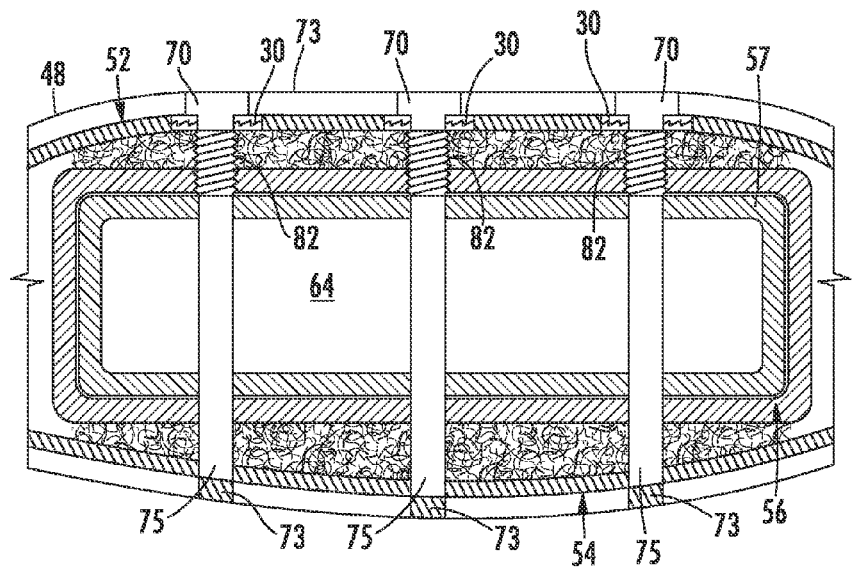
FIG. 7 illustrates a detailed cross-sectional view of the joint assembly of FIG. 6 in accordance with aspects of the present subject matter.
Figure 8:
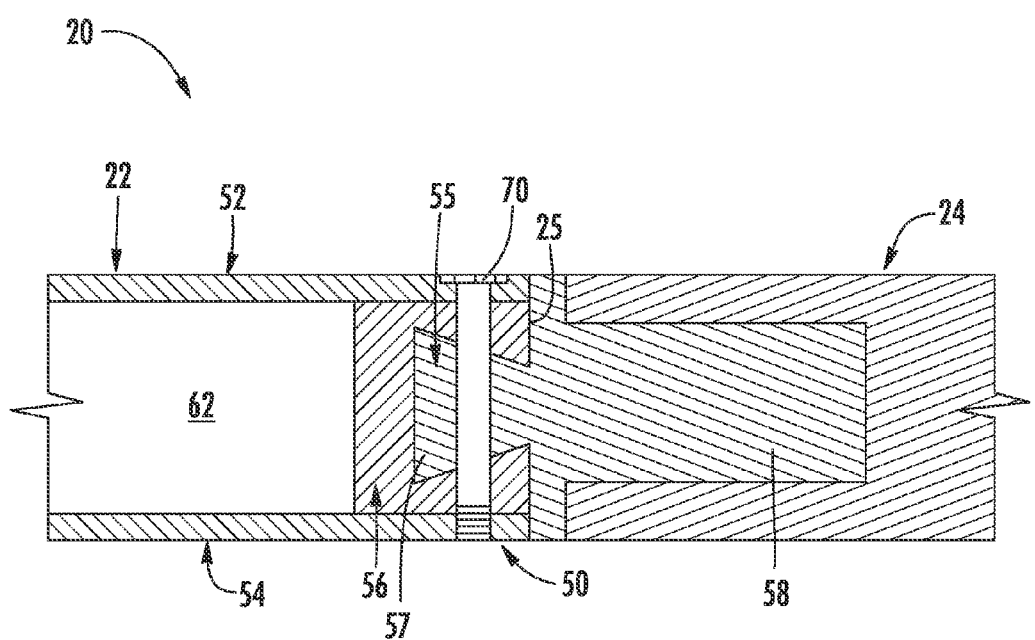
FIG. 8 illustrates a cross-sectional view of another embodiment of a rotor blade assembly viewed from the leading edge of the rotor blade in accordance with aspects of the present subject matter.
Figure 9:
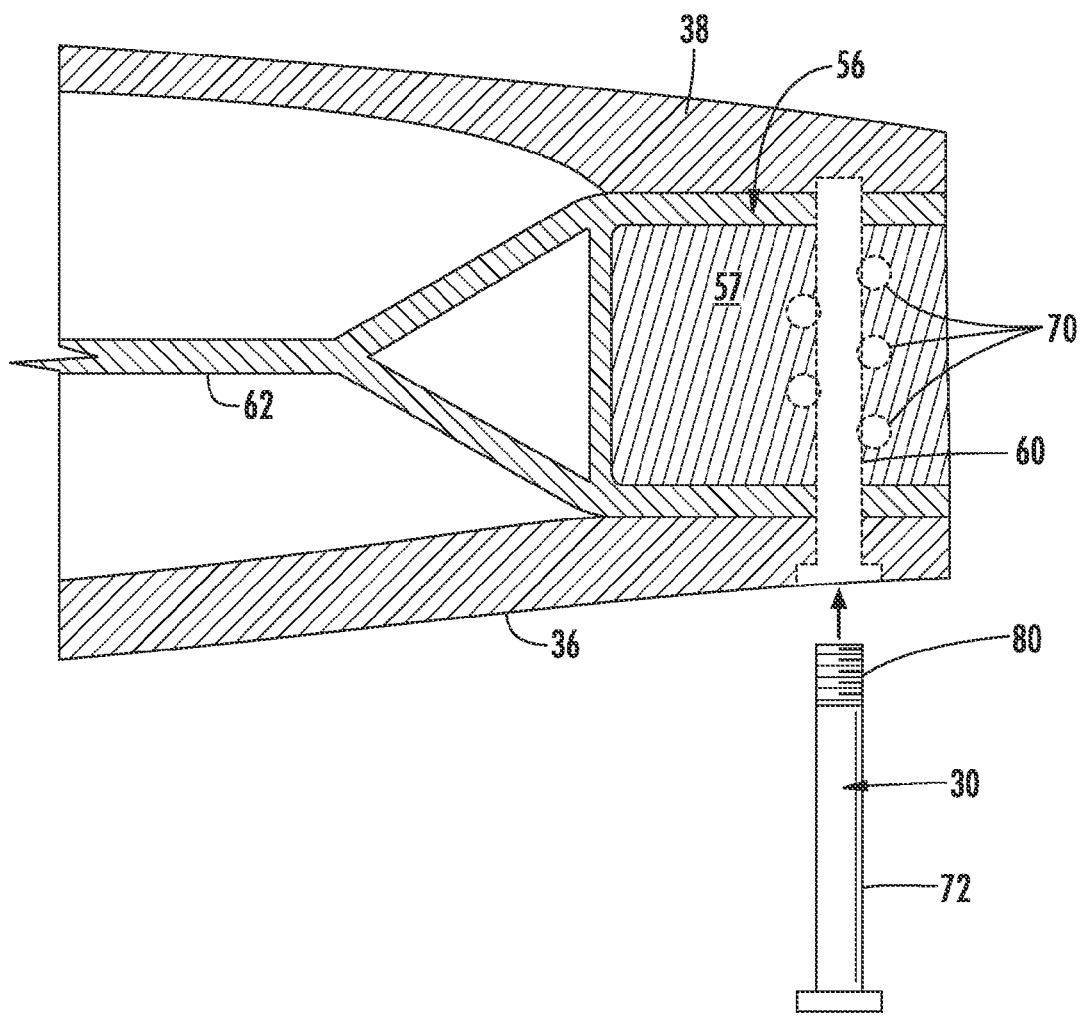
FIG. 9 illustrates a cross-sectional view of another embodiment of a rotor blade assembly viewed from the pressure side of a rotor blade in accordance with aspects of the present subject matter.
Figure 10:
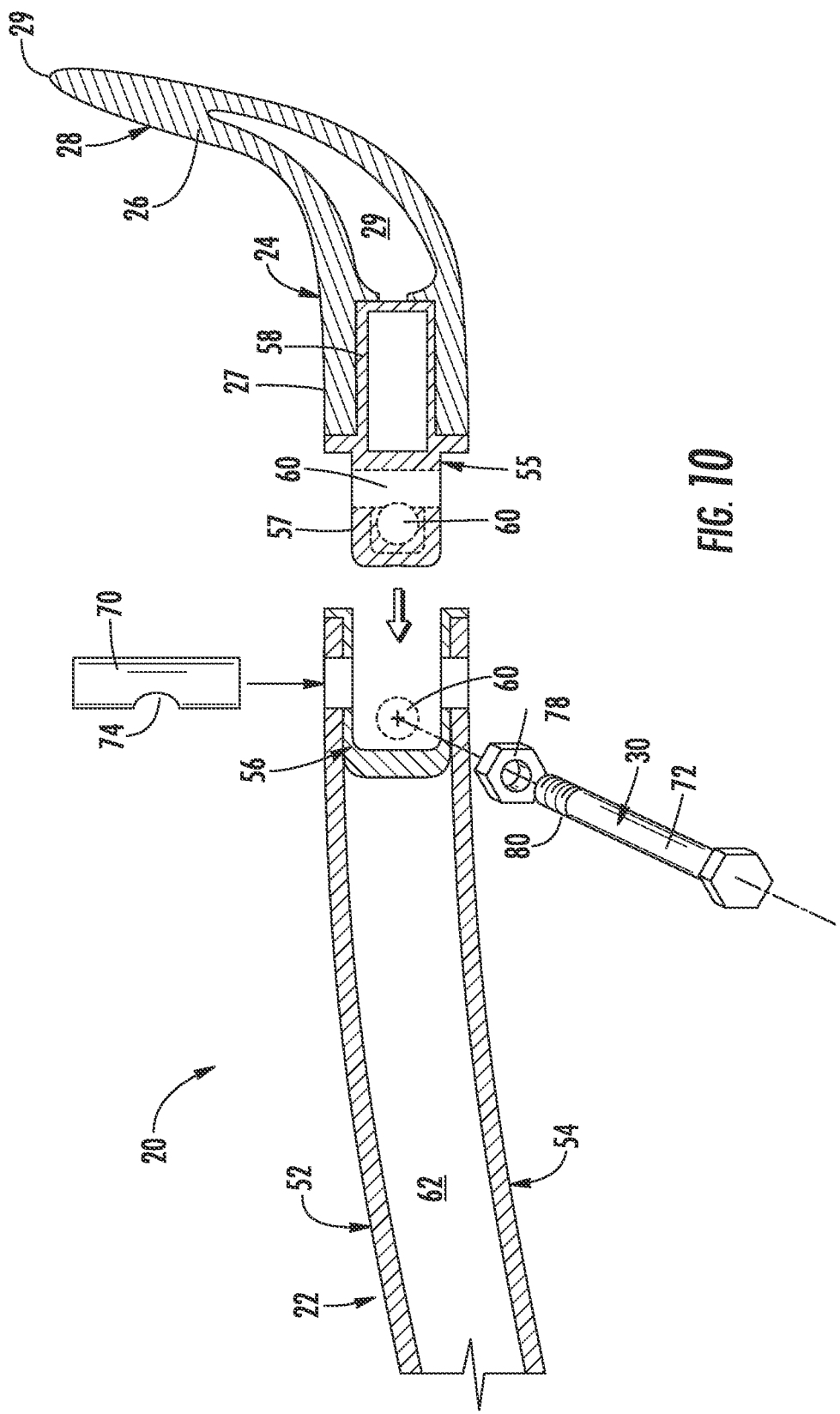
FIG. 10 illustrates an exploded view of another embodiment of a rotor blade assembly viewed from the leading edge of a rotor blade in accordance with aspects of the present subject matter.

Referring now to FIGS. 3-10, several views of the rotor blade assembly 20 and/or joint assembly 50 of the present disclosure are illustrated in accordance with aspects of the present subject matter. In particular, FIGS. 3 and 4 illustrate partial, cross-sectional views of one embodiment of the rotor blade assembly 20 viewed from the leading edge of the rotor blade 16 in an unassembled and an assembled state, respectively. FIG. 5 illustrates a partial, perspective view of one embodiment of an anti-rotation locking feature 30 for the joint assembly 50. FIGS. 6 and 7 illustrate cross-sectional views of one embodiment of the joint assembly 50 along line 6-6 of FIG. 2. FIG. 8 illustrates a cross-sectional view of another embodiment of a rotor blade assembly viewed from the leading edge of the rotor blade. FIG. 9 illustrates a cross-sectional view of another embodiment of the rotor blade assembly 20 viewed from the pressure side of the rotor blade 16. FIG. 10 illustrates an exploded view of another embodiment of the rotor blade assembly 20 viewed from the leading edge of the rotor blade 16 in an unconnected state.

As shown, the blade segments 22, 24 of the rotor blade assembly 20 may include a body shell 48 generally serving as the outer casing/covering of the blade segment 22, 24. The body shell 48 may generally define a substantially aerodynamic profile, such as by defining a symmetrical or cambered airfoil shaped cross-section. Thus, the body shell 48 of each blade segment 22, 24 may define the pressure side 32, the suction side 34, the leading edge 36 and the trailing edge 38 of the rotor blade assembly 20. In general, it should be appreciated that the aerodynamic profile of the body shell 48 of the first blade segment 22 may generally correspond to the aerodynamic profile of the body shell 48 of the second blade segment 24 (if applicable) in the area adjacent to the chord-wise extending joint 25. As such, the rotor blade assembly 20 may define a substantially continuous aerodynamic profile along its span 44.

In several embodiments, the body shell 48 of the blade segments 22, 24 may be formed as a single, unitary component. Alternatively, the body shell 48 may be formed from a plurality of shell components. For example, the body shell 48 may be manufactured from a first shell component generally defining the pressure side 32 of the body shell 48 and a second shell component generally defining the suction side 34 of the body shell 48, with such shell components being secured to one another at the leading and trailing edges 36, 38 of the shell 48. Additionally, the body shell 48 may generally be formed from any suitable material. For instance, in one embodiment, the body shell 48 may be formed entirely from a composite laminate material, such as a carbon fiber-reinforced composite or a glass fiber-reinforced composite. Alternatively, one or more portions of the body shell 48 may be configured as a layered construction and may include a core material, formed from a lightweight material such as wood (e.g., balsa), foam (extruded polystyrene foam) or a combination of such materials, disposed between layers of composite laminate material.

In addition, each of the blade segments 22, 24 may also include one or more structural components. For example, as particularly shown in FIGS. 3, 4, and 8-10, the blade segments 22, 24 may each include a shear web 62 configured to extend longitudinally within the blade shell 48 and perpendicularly between opposed spar caps 52, 54. Alternatively, the blade segments 22, 24 may include two or more shear webs 62 extending between the opposed spar caps 52, 54. The spar caps 52, 54 may similarly be configured to extend longitudinally within the blade shell 48, with the spar caps 52, 54 generally engaging inner surfaces 31, 33 of the pressure and suction sides 32, 34 of the body shell 48, respectively. In general, the shear web(s) 62 and spar caps 52, 54 may serve as a beam-like or other structural-type component for providing structural rigidity and increasing strength to the blade segments 22, 24 and, thus, the rotor blade assembly 20. It should be appreciated that the shear web(s) 62 and the spar caps 52, 54 may generally be formed of any suitable material that permits such components to function as described herein. For example, in one embodiment, the spar caps 52, 54 may be formed from a composite material, such as a unidirectional carbon fiber-reinforced composite, and the shear web(s) 62 may be formed from foam, wood or a similar lightweight material strengthened with a fiber-reinforced composite.

Figure 11:
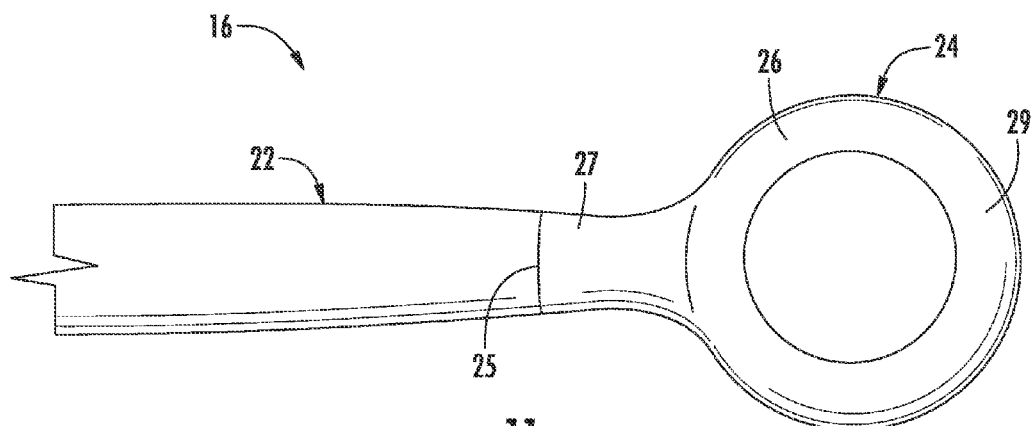
FIG. 11 illustrates one embodiment of a rotor blade assembly having a unique blade tip section in accordance with aspects of the present subject matter; and, FIG. 12 illustrates another embodiment of a rotor blade assembly having a unique blade tip section in accordance with aspects of the present subject matter.
Figure 12:
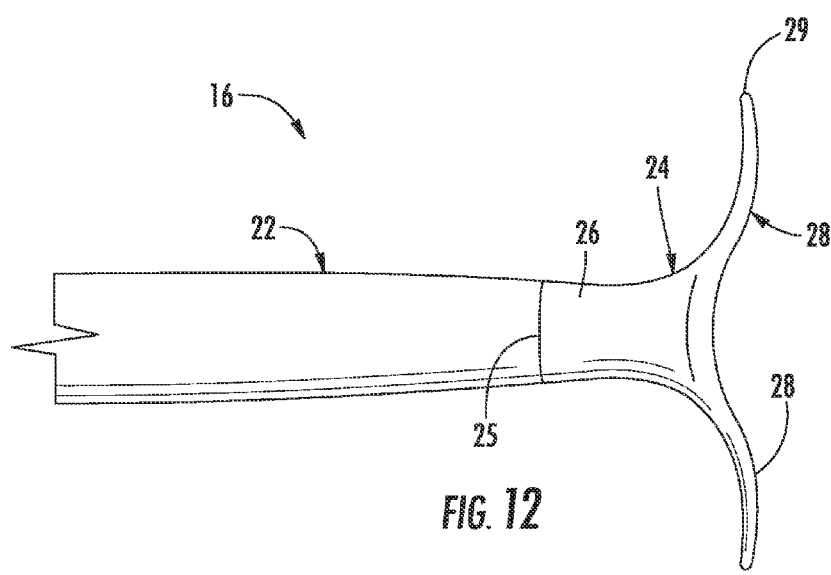

In further embodiments, one of the blade segments may correspond to a blade tip segment 26 of the rotor blade 16. For example, as shown in FIGS. 10-12, the second blade segment 24 corresponds to the blade tip segment 26 of the rotor blade 16. More specifically, in such embodiments, the blade tip segment 26 may include less than 20% of a diameter of the rotor 15 of the wind turbine 10. In alternative embodiments, the blade tip segment 26 may include more than 20% of the diameter of the rotor of the wind turbine 10. Accordingly, in one embodiment, the blade tip segment 26 can have a relatively low weight so as to reduce loads experienced by the joint assembly 50 due to the relatively outboard position of the joint 25.

As indicated above, the first and second blade segments 22, 24 may also include corresponding attachment members 55, 56 configured to permit the blade segments 22, 24 to be assembled together at the chord-wise extending joint 25 of the present subject matter. In general, the attachment members 55, 56 may include any suitable corresponding male and female components which are configured to connect the first and second blade segments 22, 24 together. As such, the attachment members 55, 56 are configured to carry all or most of the loads from the rotor blade 16. In one embodiment, the mating attachment members 55, 56 carry all of the loads except the span-wise shear loads carried by the shear-loading pins 70. For example, in the illustrated embodiments, the first blade segment 22 may comprise a post member 55 configured to at least partially be received within a corresponding recess member 56 of the second blade segment 24. It should be appreciated that, although the post and recess members 55, 56 are generally described herein as being components of the first and second blade segments 22, 24, respectively, the components may also be reversed, with the first blade segment 22 including a recess member 56 and the second blade segment 24 including a post member 55.

Referring particularly to FIGS. 3, 4, 8, and 10, the post member 55 may generally be configured as any suitable male component and may include a first portion 57 extending outwardly from the second blade segment 24 in a generally span-wise direction (i.e. a direction parallel to the span 44 of the rotor blade assembly 20). More specifically, in another embodiment, the first portion 57 of the post member 55 may extend perpendicularly from a chord-wise extending face 53 of the second blade segment 24. The post member 55 may also include a second portion mounted or otherwise disposed within the body shell 48 of the second blade segment 24. For example, in one embodiment, the post member 55 may be a machined or molded part that is inserted into the second blade segment 24. As such, the second blade segment 24 (especially when utilized as a blade tip segment 26) can be manufactured as a lightweight component. More specifically, as shown in FIGS. 3, 4, and 10, the second blade segment 24 may be manufactured with a hollow core that is subsequently filled with a lightweight material, e.g. a foam material 29. Alternatively, the post member 55 may be integral with the second blade segment 24 (e.g. the post member 55 and the second blade segment 24 may be machined or molded together as a single part).

Additionally, the recess member 56 may be generally configured as any suitable female component and may be mounted or otherwise disposed within the body shell 48 of the first blade segment 22. In various embodiments, the recess member 56 can be manufactured as a separate component that is installed within the first blade segment 22. Alternatively, the recess member 56 may be integral with the first blade segment 22 (e.g. the recess member 56 and the first blade segment 22 may be machined or molded together as a single part).

Referring generally to the figures, the first portion 57 of the post member 55 may be configured to be received within a corresponding cavity 64 defined by the recess member 56 so as to form a chord-wise extending joint 25. For example, in one embodiment, the first portion 55 of the post member 57 may be received with the cavity 64 of the recess member 56 such that the first and second blade segments 22, 24 abut against one another. As such, all or a portion of the components of the joint assembly 50 described herein may be internal of the body shell 48 of the rotor blade 16. Accordingly, the joint assembly 50 of the present disclosure provides a joint 25 that does not negatively affect aerodynamic performance of the blade 16.

It should also be appreciated that the first portion 57 of the post member 55 and the cavity 64 of the recess member 56 may generally have any suitable corresponding shapes and/or configurations, which permit the first portion 57 to be received within the cavity 64. For example, as shown in FIGS. 6 and 7, the first portion 57 may have a generally rectangular shape corresponding to a generally rectangular-shaped cross-section of the cavity 64. Thus, in such an embodiment, the recess member 56 may generally define a mating rectangular-shaped cavity 64. However, in alternative embodiments, the first portion 57 and the cavity 64 may define corresponding circular, elliptical or triangular shapes or any other suitable mating configurations. For example, as shown in FIG. 8, the first portion 57 and the cavity 64 may have a corresponding dovetail configuration.

Additionally, in one embodiment, the first portion 57 and the cavity 64 may be designed to have tightly controlled dimensions such that the first portion 57 may be securely positioned within the cavity 64. For instance, the first portion 57 and the cavity 64 may be dimensioned so that the total clearances enable interchangeable (non-matched) blade parts 22 and 24 for manufacturing flexibility while still being about to tolerate moment loads transferred through the interface parts 56 and 58 and not carried by the shear pins 70. Additionally, in another embodiment, the post and recess members 55, 56 may define corresponding tapered profiles or may otherwise be correspondingly drafted to ensure proper positioning of the first portion 57 of the post member 55 within the cavity 64 of the recess member 56.

Further, the joint assembly 50 may also include an adhesive to further secure the recess member 56 within the first blade segment 22. For example, as shown in FIG. 6, the chord-wise extending joint 25 may include an adhesive 76 between the recess member 56 and the spar caps 52, 54. In further embodiments, the adhesive 76 may be utilized at any suitable location near or around the chord-wise extending joint 25. It should also be understood that the adhesive may be any suitable adhesive include adhesive tape, glue, putty, and/or similar. In still further embodiments, the adhesive 76 may be eliminated altogether to provide a joint assembly 50 having a blade tip segment 26 that is easily changeable and/or customized according to changing wind conditions.

Moreover, it should be appreciated that the post and recess members 55, 56 may generally be formed from any suitable material(s). For example, in one embodiment, the post and recess members 55, 56 may be formed from any suitable laminate composite material. It should also be appreciated that the first and second blade segments 22, 24 may include more than one post or recess member 55, 56 respectively. For instance, the second blade segment 24 may include two or more post members 55 at least partially extending outwardly from the second blade segment 24 in a generally spanwise direction. In such an embodiment, the first blade segment 22 may include an equal number of corresponding recess members 56. Additionally, in another embodiment, the first blade segment 22 may include both post and recess members 55, 56 and the second blade segment 24 may include corresponding post and recess members 55, 56.

Referring generally to FIGS. 3-10, the rotor blade assembly 20 and/or joint assembly 50 may also include one or more shear-loaded pins 70 configured through the chord-wise extending joint 25 to secure the first blade segment 22 to the second blade segment 24. More specifically, the shear-loaded pin(s) 70 may be configured to secure the first portion 57 of the post member 55 within the cavity 64 of the recess member 56. It should be understood that any number of shear-loaded pins 70 may be utilized depending on the desired strength of the joint 25. For example, as shown in FIG. 9, five shear-loaded pins 70 are used, however, in further embodiments, more than five shear-loaded pins 70 or less than five shear-loaded pins 70 may be used.

In addition, the shear-loaded pin(s) 70 may extend in a generally flap-wise direction (i.e. from the suction side surface 32 to the pressure side surface 34 of the body shell 48) or in a generally edge-wise direction (i.e. from the leading edge 36 to the trailing edge 38 of the rotor blade 16). Further, the shear-loaded pins 70 may extend through one or both of the spar caps 52, 54 to provide further support to the chord-wise extending joint 25. In additional embodiments, the shear-loaded pin(s) 70 may extend through one or both of the spar caps 52, 54 and one or both of the pressure or suction side surfaces 32, 34. In such an embodiment, the shear-loaded pin(s) 70 may be recessed within or generally flush with the pressure or suction side surfaces 32, 34 of the body shell 48. In alternative embodiments, the shear-loaded pin(s) 70 may extend between the pressure or suction side surfaces 32, 34 in a generally flap-wise direction within the body shell 48 such that the shear-loaded pin(s) 70 do not intersect the pressure or suction side surfaces 32, 34 or the spar caps 32, 34.

As used herein, the term "flap-wise direction" is meant to encompass the direction extending from the suction side surface 32 to the pressure side surface 34 of the body shell 48, whereas the term "edge-wise direction" is meant to encompass the direction extending between the leading edge 36 and the trailing edge 38 that is perpendicular to the flap-wise direction.

Referring specifically to FIGS. 5 and 6, the shear-loaded pins 70 may include opposing ends 75 that are configured to be generally flush with the body shell 48 of the rotor blade 16 when assembled in the joint assembly 50. In further embodiments, the ends 75 of the shear-loaded pins 70 may be recessed with the body shell 48 of the rotor blade 16. As such, a filler material 73 may be used to cover the ends 75 of the shear-loaded pins 70 to provide a smooth aerodynamic surface corresponding to the contour of the body shell 48. It should be understood that the filler material 73 may be any suitable material known in the art. For example, in various embodiments, the filler material 73 may be a putty, an adhesive, a foam, or similar.

In addition, the rotor blade assembly 20 and/or the joint assembly 50 may also include an internal anti-rotation locking feature 30 configured between the suction side surface 34 and the pressure side surface 32. The anti-rotation locking feature 30 is configured to secure the shear-loaded pin 70 within the body shell 48 of the rotor blade 16. More specifically, in various embodiments, the locking feature 30 may be an anti-rotational component configured to prevent the shear-loaded pin(s) 70 from rotating out of the body shell 48. For example, as shown particularly in FIGS. 4 and 5, the locking feature 30 may be a shear bolt component 72 configured with each of the shear-loaded pin(s) 70. More specifically, the joint assembly 50 may include one or more edge-wise and/or flap-wise through-holes 60 configured to receive the shear-loaded pins 70 and/or the shear bolt component 72. For example, the post member 55 and/or the recess member 56 may include edge-wise and/or flap-wise through-holes 60 configured for receipt of the shear-loaded pins 70 and/or one or more shear bolt components 72. In addition, each of the shear-loaded pins 70 may have an exterior surface including one or more grooves 74. In such an embodiment, when the shear-loaded pins 70 are inserted into the flap-wise through-holes 60, the grooves 74 are configured to align such that the shear bolt component 72 can be inserted into a corresponding edge-wise through-hole 60 and the grooves 74 of each shear-loaded pin 70. As such, the shear bolt component 72 can be inserted (e.g. by drilling or reaming) into the corresponding edge-wise through-hole 60 and the grooves 74 of the shear-loaded pins 70 so as to extend in a substantially edge-wise direction from the leading edge 36 to the trailing edge 38 of the body shell 48. Accordingly, the shear bolt component 72 is configured to secure the shear-loaded pins 70 within the body shell 48 via the grooves 74.

Referring to FIGS. 9 and 10, the anti-rotation locking feature 30 may further include a securing means for preventing the locking feature 30 from loosening due to vibration and other forces. For example, as shown in FIG. 9, the shear bolt component 72 includes a threaded outer surface 80 such that the bolt component 72 may be drilled and/or reamed through the leading edge 36 of the body shell 48 and the post member 55 such that the bolt component 72 stays in place. In addition, as shown in FIG. 10, the rotor blade assembly 20 and/or joint assembly 50 of the present disclosure may also include at least one nut component (not shown) and/or a washer component 78 configured with the shear bolt component 72 to further secure the shear bolt component 72 within the body shell 48. For example, as shown, at least a portion of the shear bolt component 72 may have a threaded surface 80 such that when the shear bolt component 72 is inserted into the edge-wise through-hole 60 and the grooves 74 of the shear-loaded pin 70, a washer component 78 engages the threaded surface 80 to further secure the shear bolt component 72 within the body shell 48.

In a further embodiment, the locking feature 30 may be internal to the post member 55. For example, the through-holes 60 of the post member 55 may have a threaded internal surface such that the shear-loaded pin(s) 70 can be inserted and threaded therein. In such an embodiment, an additional anti-rotational device may be configured with the shear-loaded pins 70 to prevent the shear-loaded pins 70 from rotating out of the post member 55.

Referring to FIGS. 6 and 7, another embodiment of an anti-rotation locking feature 30 of the joint assembly 50 of the present disclosure is illustrated. For example, as shown, the joint assembly 50 includes a plurality of shear-loaded pins 70 extending in a generally flap-wise direction within the rotor blade 16. At least a portion of each of the shear-loaded pins 70 includes a threaded outer surface 82. For example, as shown, an upper portion of the shear-loaded pins 70 includes a threaded outer surface 82. As such, the locking feature 30 may be any suitable anti-rotational device, such as a washer component. More specifically, in one embodiment, the washer component may be a wedge-lock washer, e.g. a Nordlock© washer. More specifically, the wedge-lock washers are configured to secure bolted joints with tension instead of friction. Over the operational life cycle, wedge-lock washers can increase operational reliability and lower maintenance costs. It should also be understood that any other locking feature 30 may also be used with the shear-loaded pins 70 to prevent the shear-loaded pins 70 from rotating out of the body shell 48. For example, in a further embodiment, a diameter $D_2$ of the shear-loaded pin 70 (FIG. 5) may be greater than a diameter $D_1$ of the corresponding through-hole 60 (FIG. 3) to create an interference fit between the shear-loaded pin 70 and the through-hole 60. As such, the interference fit between the shear-loaded pin 70 and the through-hole 60 is configured to secure the shear-loaded pin 70 within the body shell 48.

In additional embodiments, the anti-rotation locking feature 30 may be any suitable component so as to secure the shear-loaded pins 70 within the body shell 48 of the rotor blade 16. For example, the locking feature 30 may include any one of or a combination of the following: a nut component, a wire component, an adhesive, a washer component, a tab component, one or more nylon inserts, oval-shaped threads, or similar. For example, the nut component may be any type of fastener with a threaded hole, including, but not limited to an acorn nut, a barrel nut, a cage nut, a clip-on nut (J-nut or U-nut), a coupling nut, a cross dowel, a flange nut (collar nut), an insert nut, a slotted nut, a split nut, a sleeve nut, a square nut, a swage nut, a T-nut, a T-slot nut (T-groove nut), a weld nut, a well nut, or similar. As such, the nut component may be used opposite a mating shear-loaded pin 70 to secure the shear-loaded pin 70 within the rotor blade 16. Further, the wire component may include a positive locking device, e.g. a safety wire or lock wire that prevents the shear-loaded pins 70 from loosening due to vibration and other forces. Further, the washer component, as mentioned, may be a wedge-lock washer, e.g. a Nordlock© washer.

Referring now to FIGS. 11 and 12, the illustrated embodiments depict first and second blade segments 22, 24 joined together at joint 25, wherein each rotor blade 16 has a unique blade tip segment 26. As shown in FIG. 11, the blade tip section 26 may include a ringlet configuration. In further embodiments, as shown in FIGS. 10 and 12, the blade tip section 26 may be configured as a winglet-type tip section. As such, one or more winglets 28 may generally be defined between the joint end 27 and the blade tip 29. It should be appreciated that the winglet 28 may have any suitable configuration known in the art. For example, the winglet 28 may be configured as a suction side winglet (FIG. 10), a pressure side winglet, or both (FIG. 12). Additionally, the winglet 28 may define any suitable sweep angle, cant angle, toe angle and/or twist angle, all of which are commonly known terms in the aerodynamic art. Further, the winglet 28 may define any suitable radius of curvature and may have any suitable aspect ratio (i.e., ratio of the span of the winglet 28 to the platform area of the winglet 28). In still further embodiments, the blade tip section 26 may be configured as a straight tip section, such as by being configured similar to the first blade segment 22 described above with reference to FIG. 1 and extending in a substantially span-wise direction.

The various embodiments of the blade tip segments 26 described herein are provided to illustrate that the rotor blade assembly 20 may be customized with any suitable blade tip segment 26 known in the art depending on current wind conditions and/or wind site assessments. For example, due to the bolted-joint design of the joint assembly 50, the blade tip segments 26 can be easily removed and replaced with another blade tip segment 26 to alter the aerodynamic properties of the rotor blade 16.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly for a wind turbine, the rotor blade assembly comprising:
    a first blade segment comprising a recess member defining a cavity configured as a female component;
    a second blade segment connected to the first blade segment at a maintenance-free chord-wise extending joint, wherein the second blade segment further defines a post member extending outwardly in a generally span-wise direction and configured as a male component, and further wherein the post member is configured to be received within the corresponding cavity defined by the recess member of the first blade segment;
    a body shell defining a generally aerodynamic profile of the first blade segment and the second blade segment, the body shell comprising a suction side surface and a pressure side surface;
    at least one shear-loaded pin configured through the chord-wise extending joint, the shear-loaded pin extending in a generally flap-wise direction, the at least one shear-loaded pin configured through both the suction side surface and the pressure side surface of the body shell; and,
    an anti-rotation shear bolt component engaged perpendicularly with the at least one shear-loaded pin, the shear bolt component configured to secure the shear-loaded pin within and through the body shell, the post member, and the recess member.

2. The rotor blade assembly of claim 1, further comprising a shear web extending longitudinally within the body shell from the suction side surface to the pressure side surface, the shear web being disposed between opposed spar caps, wherein the at least one shear-loaded pin extends through at least one of the spar caps.

3. The rotor blade assembly of claim 1, wherein the anti-rotation shear bolt component further comprises at least one of a nut component, a wire component, an adhesive, a washer component, a tab component, one or more nylon inserts, or oval-shaped threads configured therewith.

4. The rotor blade assembly of claim 1, wherein the at least one shear-loaded pin further comprises an exterior surface comprising at least one groove.

5. The rotor blade assembly of claim 1, wherein the chord-wise extending joint further comprises one or more through-holes configured to receive the at least one shear-loaded pin or the shear bolt component.

6. The rotor blade assembly of claim 5, wherein a diameter of the shear-loaded pin is greater than a diameter of the corresponding through-hole to create an interference fit between the shear-loaded pin and the through-hole.

7. The rotor blade assembly of claim 5, further comprising at least one of a nut component or a washer component configured with the shear bolt component and configured to secure the shear bolt component within the body shell.

8. The rotor blade assembly of claim 1, wherein the second blade segment corresponds to a blade tip of the rotor blade, wherein the blade tip comprises less than 20% of a diameter of a rotor of the wind turbine.

9. The rotor blade assembly of claim 1, wherein the chord-wise extending joint further comprises an adhesive.

10. A rotor blade assembly for a wind turbine, the rotor blade assembly comprising:
    a first blade segment comprising a recess member, the recess member defining a cavity therein;
    a second blade segment comprising a post member extending outwardly from a chord-wise extending face of the second blade segment, the post member configured within the cavity of the recess member so as to define a chord-wise extending joint between the first blade segment and the second blade segment,
    a body shell defining a generally aerodynamic profile of the first blade segment and the second blade segment, the body shell comprising a suction side surface and a pressure side surface,
    at least one shear-loaded pin configured through the chord-wise extending joint, the shear-loaded pin extending in a generally flap-wise direction, the at least one shear-loaded pin configured through both the suction side surface and the pressure side surface of the body shell; and,
    an anti-rotation shear bolt component engaged perpendicularly with the at least one shear-loaded pin, the shear bolt component configured to secure the shear-loaded pin through the body shell, the post member, and the recess member.

11. The joint assembly of claim 10, wherein the at least one shear-loaded pin further comprises an exterior surface comprising a groove.

12. The joint assembly of claim 10, further comprising one or more through-holes configured to receive the at least one shear-loaded pin or the shear bolt component.

13. The joint assembly of claim 10, further comprising a filler material covering one or more opposing ends of each shear-loaded pin, wherein the filler material provides an aerodynamic surface corresponding to the contour of the body shell.

14. A rotor blade joint assembly for connecting multiple blade segments of rotor blade of a wind turbine, the joint assembly comprising:
    a recess member configured for receipt within a first blade segment, the recess member defining a cavity configured therein;
    a post member configured for receipt within a second blade segment, the post member comprising a first portion configured to extend outwardly from a chord-wise extending face of the second blade segment and a second portion configured for receipt within the cavity;
    at least one shear-loaded pin configured to extend through the first portion of the post member and the recess member when the first portion of the post member is received within the recess member, wherein the shear-loaded pin is configured in a generally flap-wise direction when the first portion of the post member is received within the recess member, the at least one shear-loaded pin configured through both the suction side surface and the pressure side surface of the body shell; and,
    an anti-rotation shear bolt component engaged perpendicularly with the at least one shear-loaded pin, the shear bolt component configured to secure the shear-loaded pin through the body shell, the post member, and the recess member.

15. The joint assembly of claim 14, wherein the first portion of the post member and the cavity of the recess member comprise a corresponding dovetail configuration.

\* \* \* \* \*